2 Sheets--Sheet 1.

S. FOREHAND & H. C. WADSWORTH.
Die for Forging Spinning-Ring Blanks.

No. 161,334. Patented March 30, 1875.

Witnesses:
Thos. H. Dodge
Edwin C. Moore

Inventors:
Sullivan Forehand
Henry C. Wadsworth

THE GRAPHIC CO. PHOTO-LITH. 39 & 41 PARK PLACE, N.Y.

2 Sheets--Sheet 2.

S. FOREHAND & H. C. WADSWORTH.
Die for Forging Spinning-Ring Blanks.

No. 161,334. Patented March 30, 1875.

Witnesses:
Thos. H. Dodge
Edwin C. Moore

Inventors:
Sullivan Forehand
Henry C. Wadsworth

THE GRAPHIC CO. PHOTO-LITH. 39 & 41 PARK PLACE, N.Y.

UNITED STATES PATENT OFFICE.

SULLIVAN FOREHAND AND HENRY C. WADSWORTH, OF WORCESTER, MASSACHUSETTS.

IMPROVEMENT IN DIES FOR FORGING SPINNING-RING BLANKS.

Specification forming part of Letters Patent No. 161,334, dated March 30, 1875; application filed February 20, 1875.

CASE A.

*To all whom it may concern:*

Be it known that we, SULLIVAN FOREHAND and HENRY C. WADSWORTH, both of the city and county of Worcester, and Commonwealth of Massachusetts, have made a certain invention or Improvement in Dies for making Blanks for Spinning-Rings, and for other purposes, from bars of iron or steel; and we do hereby declare that the following is a full, clear and exact description of the same, reference being had to the accompanying drawings forming a part of this specification, and in which—

Figure 1:
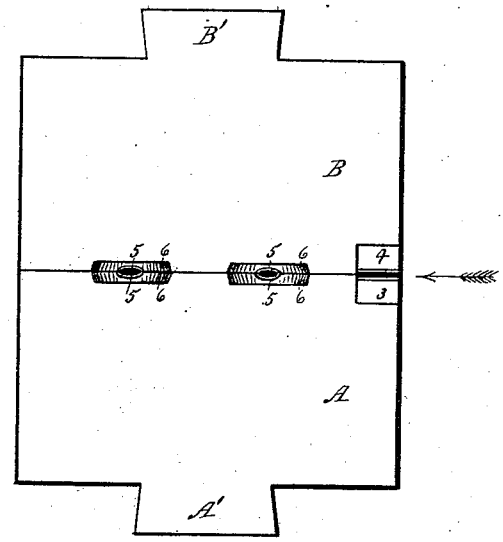
Figure 2:
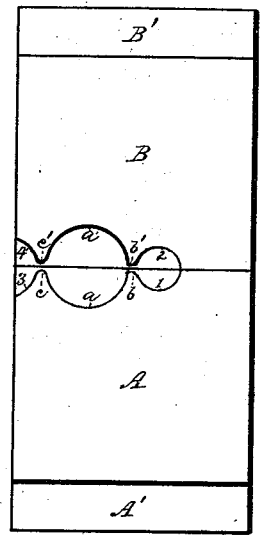
Figure 3:
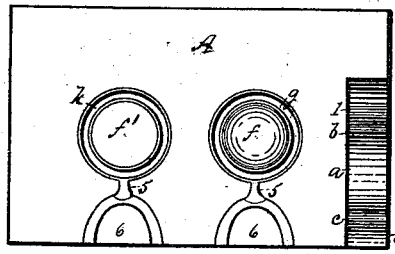
Figure 4:
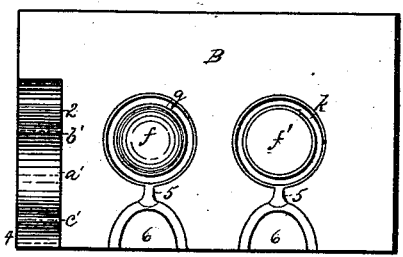
Figure 5:
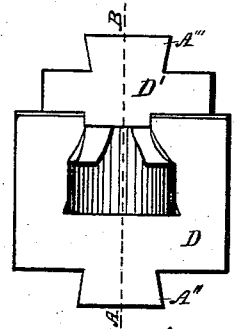
Figure 6:
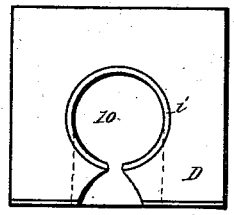
Figure 7:
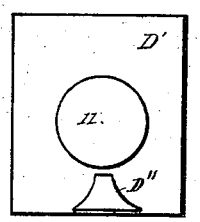
Figure 8:
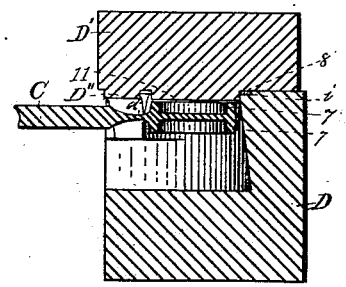
Figure 9:
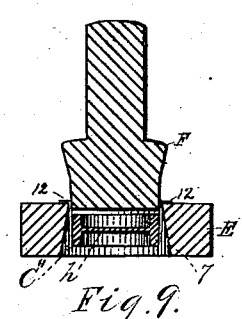
Figure 10:
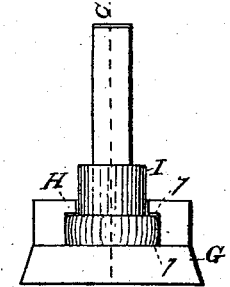
Figure 11:
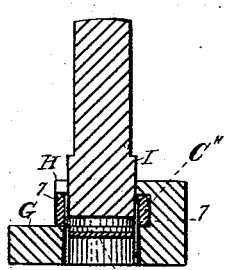
Figure 12:
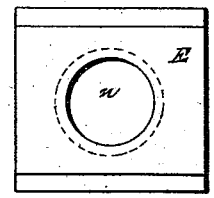
Figure 13:
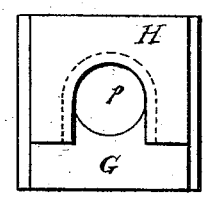

Figure 1 represents a front view of one portion of the mechanism. Fig. 2 represents an end view of the mechanism shown in Fig. 1, looking in the direction of the arrow. Fig. 3 represents a top or plan view of the lower half of Fig. 1. Fig. 4. represents a bottom view of the upper half of Fig. 1, it being shown bottom side up, as will be hereafter explained. Fig. 5 represents a front view of another portion of the mechanism employed in said manufacture. Fig. 6 represents a top or plan view of the lower part of Fig. 5. Fig. 7 represents a bottom view of the upper part of Fig. 5, as will be hereafter explained. Fig. 8 represents a vertical central section of the mechanism shown in Fig. 5, line A B, together with a section of the blank-ring as it appears at one stage of the operation. Fig. 9 represents a vertical central section of the cold-ring-trimming device, as will be hereafter explained. Fig. 10 represents a front view of another portion of the mechanism employed for punching out the central web of the ring. Fig. 11 represents a vertical central section on line B C, Fig. 10, after the central web of the ring has been punched out, as will be hereafter explained. Fig. 12 represent a top or plan view of the lower part of Fig. 9, as will be hereafter explained. Fig. 13 represents a top or plan view of the lower part of Fig. 10, as will be hereafter explained; and Figs. 14, 15, 16, 17, 18, 19, 20, 21, and 22 represent different views of the blank-ring as it appears during different stages of the manufacture.

To enable those skilled in the art to which our invention belongs to make and use the same, we will proceed to describe it more in detail.

In the drawings, the part marked A represents the lower half, and B the upper half, of the first set of dies employed in the manufacture of the blank-ring. It will be understood that the tongue A' of the die A is to be fitted and wedged into a suitable bed, while the tongue B' of the die B is to be fitted and wedged securely into a suitable hammer-head, so that as the upper half of the hammer-head B is raised and lowered, it will always register with the stationary die A. It will also be understood that the part A'' of the part D, and the part A''' of the part D', Fig. 5, are to be in like manner wedged into their respective holding parts; the part D being stationary, like the part A, while the part D' is movable, like the part B.

Figure 14:
Figure 16:
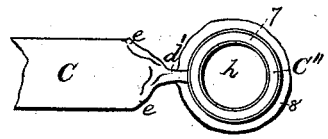
Figure 18:
Figure 15:
Figure 17:
Figure 19:
Figure 20:
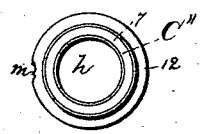
Figure 21:
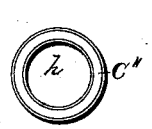

The operation is as follows: The operator takes a bar of iron, C, after the end has been properly heated, and places the heated end edgewise between the dies A and B, so that when the die B descends the heated end of the bar will be caught between the recessed parts $a\ a'$, $b\ b'$, $c\ c'$, and 3 and 4 of the dies A and B, and by which operation the end of the bar is swaged or forged into the form shown at C', Fig. 14, the parts $b\ b'$ of the dies bending and turning down the ends of the fibers of the iron of the end of the bar, as shown in Fig. 14, the small projection $d$ being crowded or forced by said parts $b\ b'$ into the spaces 1 and 2, while the parts $c\ c'$ of the dies form the neck $d'$, connecting the part C' to the bar C, the parts 3 and 4 of the dies forming the concaved shoulders $e\ e$, as shown in Figs. 14 and 15, Fig. 15 being an edge view of Fig. 14. The operator now places the part C' flatwise upon the rounded projection $f$ of the die A, the neck $d'$ resting in the small concavity 5, while the shoulder part $e\ e$ rests in the concavity 6, whereby, when the upper die B descends, the projection $f$ upon the under side of die B will strike the center of the part C', which being swaged and pressed between the corresponding parts $f\ f$ of the dies, the metal composing the central part is forced out, and at the same time is forced into the circular concavities $g$ $g$ of the respective dies, whereby the part C′ is forced or swaged into the shape shown at C″, Figs. 16 and 17, and having a thin central web, $h$, in the center, and a thick circular flange, 7, on each side of the web, and a thin flange, 8, upon the outside, as indicated in the same figures. The operator now places the part C″ so that its flange 8 will rest in the groove $i$ of the lower half D of the hot-trimming device, (shown in Fig. 5,) while one of the flanges, 7, passes through the opening 10 in the same part, and as the upper half of the hot-trimming device D′ (which is connected with suitable mechanism for raising and depressing it accurately) descends, the projection 11 of the part D′ strikes upon the upper flange 7 of the part C″, and forces the parts thus struck down through opening 10, thus trimming off flange 8, as indicated in Fig. 8. The operator then places the part C″ thus trimmed, as shown in Figs. 18 and 19, between the dies A and B, so that web $h$ will be compressed between the rounded projections $f'$ $f'$ of said dies as the die B descends, whereby web $h$ will be flattened out still thinner, while the flanges 7 7 will be compressed into the circular grooves $k$ $k$, and compressed and worked still more, and by which operation a second flange or rib, 12, will be thrown out from the part C″, and the neck $d'$ will be severed, or so nearly so that the operator by a slight blow can break the neck, thus separating the part C″, as shown at $m$, and which part C″ is now taken by the operator and placed into the cold-trimming device E and F, (see Figs. 9 and 12,) the part E having a hole, $n$, through it, the lower part of which is tapering, as shown in Fig. 9. Hole $n$ is large enough to allow the flanged parts 7 7 of the part C″ to pass through; consequently, when the operator first places the part C″ (shown in Fig. 20) into the trimming device, one of the flanges 7 passes through hole $n$ until rib 12 strikes the top of the part E, and as plunger F is forced down by suitable mechanism, it strikes the upper flange 7, and forces the part C″ down through hole $n$, with its rib 12 trimmed off, as shown in Fig. 9, which is a vertical central section of the cold-trimming device, and of the part C″ after its rib 12 has been trimmed therefrom, as above described.

It will be understood that the part E is to be secured in some suitable manner, so that the hole $n$ will always register with the round face of plunger F when the latter descends, a vertical central section of which is shown in Fig. 9.

The operator now takes the part C″ (shown in Fig. 21) and places it in the trimming device G, H, and I, (see Figs. 10, 11, and 13,) so that the web $h$ will be just over the hole $p$, while one of the flanges 7 will be under the projecting part H, as shown in Figs. 10 and 11, while the other flange 7 will rest upon the part G, as indicated in the same figures. A plunger, I, (moved by proper mechanism,) now descends. It strikes the central web $h$, and separates it from the part C″, as indicated in Fig. 11, which is a vertical central section on line B C, Fig. 10.

Figure 22:

The part C″, Fig. 22, now constitutes a blank for a spinning-ring, which may be finished up in the ordinary manner for use.

It will be observed that the upper surfaces of the projections $f$ $f$ are more convex than the upper surfaces of the projections $f'$ $f'$; consequently they tend to force the metal, while in a highly-heated state, from the center outward, while at the same time the same metal is being forced into the circular grooves $g$ $g$ to form the flanges 7 7.

It will also be observed that the metal of the end of the bar C, after the first blank ring has been made, and all subsequent blank rings, is left rounded or turned down, as shown at $e$ $e$, thus insuring the production of perfect rings with but little waste of metal at the end $d$.

It will also be noticed that the part D′ has a projection, D″, which forces down the shouldered part $e$ $e$ when the flange or rib 8 is trimmed off.

From the foregoing description it will be seen that our blanks for spinning-rings can be made from flat bars of iron or steel, and in such a manner as to use or utilize in the manufacture thereof a greater part of the metal, while at the same time, by the process of working the metal into the blank-ring form, (shown in Figs. 11 and 22,) the fibers of the metal are bent around into circular form, so that when the ring is finished up there will be great uniformity of texture of metal upon those parts upon which the traveler runs, or over which it is drawn during the operation of spinning. Then, again, the process of making the blank ring as above described is such as to greatly refine the iron or steel, thereby remedying any defects which exist in the bar C; and those skilled in the art to which our invention belongs will readily appreciate this important advantage, which results from our improved mode or process of manufacturing blank spinning-rings from flat bars of metal, as above described.

Aside, however, from the foregoing advantages, our improved process will enable the manufacturer to produce blank spinning-rings at a much less expense than can be produced by the old modes of welding the ends of a bar to form a ring, or of punching out blank rings, while the blank ring made by our improved process is free from the many serious objections which are found to exist in rings made by welding the ends or punching the blank ring, as before alluded to.

The improved mode or process of making our spinning-ring blank, as well as the improved blank itself, form, respectively, the subject-matter of a separate application for Letters Patent of even date herewith.

Having described our improvements in machines for making blank rings for spinning-frames, what we claim therein as new and of our invention, and desire to secure by Letters Patent, is—

1. The combination, with the part A, provided with the openings or recessed parts $a$, 1, and 3, and projections $b$ and $c$, recess 6, concavity 5, rounded projection $f$, and circular groove $g$ of the part B, provided with openings or recessed parts $a'$, 2, and 4, projections $b'$ $c'$, recess 6, concavity 5, rounded projection $f$, and circular groove $g$, substantially as and for the purposes set forth.

2. The combination, with the peculiarly-constructed part D, of the part D′, substantially as and for the purposes set forth.

3. The combination, with the part G H, of the central trimming-plunger I, substantially as and for the purposes set forth.

SULLIVAN FOREHAND.
HENRY C. WADSWORTH.

Witnesses:
  THOS. H. DODGE,
  EDWIN E. MOORE.